(12) United States Patent
Gibbons

(10) Patent No.: US 7,047,230 B2
(45) Date of Patent: May 16, 2006

(54) DISTINCT SAMPLING SYSTEM AND A METHOD OF DISTINCT SAMPLING FOR OPTIMIZING DISTINCT VALUE QUERY ESTIMATES

(75) Inventor: Phillip B. Gibbons, Pittsburgh, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 458 days.

(21) Appl. No.: 10/237,993

(22) Filed: Sep. 9, 2002

(65) Prior Publication Data

US 2004/0049492 A1    Mar. 11, 2004

(51) Int. Cl.
*G06F 17/30* (2006.01)

(52) U.S. Cl. .................. 707/2; 707/10; 707/103 R; 717/141

(58) Field of Classification Search .................. 707/1, 707/100, 103 R, 10, 2, 6, 202; 702/20; 717/141
See application file for complete search history.

(56) References Cited

U.S. PATENT DOCUMENTS

| | | | | |
|---|---|---|---|---|
| 6,012,064 A * | 1/2000 | Gibbons et al. | ........ | 707/103 R |
| 6,044,370 A * | 3/2000 | Anfindsen | ........ | 707/4 |
| 6,092,065 A * | 7/2000 | Floratos et al. | ........ | 707/6 |
| 6,108,647 A * | 8/2000 | Poosala et al. | ........ | 707/1 |
| 6,108,666 A * | 8/2000 | Floratos et al. | ........ | 707/104.1 |
| 6,122,644 A * | 9/2000 | Graefe et al. | ........ | 707/202 |
| 6,226,629 B1 * | 5/2001 | Cossock | ........ | 707/3 |
| 6,289,334 B1 * | 9/2001 | Reiner et al. | ........ | 707/3 |
| 6,292,804 B1 * | 9/2001 | Ardoin et al. | ........ | 707/102 |
| 6,373,971 B1 * | 4/2002 | Floratos et al. | ........ | 707/6 |
| 6,714,874 B1 * | 3/2004 | Myers et al. | ........ | 702/20 |
| 6,865,567 B1 * | 3/2005 | Oommen et al. | ........ | 707/2 |
| 6,961,930 B1 * | 11/2005 | Waldspurger et al. | ........ | 717/141 |
| 2002/0083067 A1 * | 6/2002 | Tamayo et al. | ........ | 707/100 |

OTHER PUBLICATIONS

Smith, Bradley J. et al., "The Exponential Hash Function", The ACM Journal of Experimental Algorithmics, vol. 2, Article 3, 1997, pp. 1-18.*

Vitter, Jeffrey Scott, "Random Sampling with a Reservoir", ACM Transactions on Mathematical Software, vol. 11, No. 1, Mar. 1985, pp. 37-57.*

Gibbons, Phillip B.; Distinct Sampling for Highly-Accurate Answers to Distinct Values Queries and Event Reports;Proceedings of the 27th VLDB Conference; Roma, Italy; Sep. 2001.

* cited by examiner

*Primary Examiner*—Shahid Alam

(57) ABSTRACT

For use with a database that accommodates distinct value queries having predicates, a distinct sampling system and a method of distinct sampling. In one embodiment, the distinct sampling system includes a scanning subsystem that is configured to scan each row in the database for a distinct target attribute, employ a hash function to map the distinct target attribute to an attribute priority level, maintain random samples of each row based on a sample priority level and a sample size, and produce a distinct sample therefrom. The distinct sampling system further includes a distinct query estimator that is configured to receive the distinct value queries, cause the distinct value queries to be executed on the distinct sample to retrieve a result, and adjust the result to produce a distinct estimate therefrom.

20 Claims, 4 Drawing Sheets

System Performance by Activity

Activity: Final Case Activity

Date Range: March 6, 2002 14:00-23:59

WO: Work Offered    WH: Work Handled    ABD: Work Abandoned    ABD Rate: Abandoned Rate
Avg PPT: Average Pre-Processing Time    Avg SA: Average Speed to Answer    Avg HT: Average Handle Time

| Activity | WO | WH | ABD | ABD BD Rate | Avg PPT | Avg SA | Avg HT |
|---|---|---|---|---|---|---|---|
| Final Case Activity | 184,760 | 184,760 | 0 | 0.00% | 00:34 | 03:09 | 00:32 |

FIGURE 4

DISTINCT SAMPLING SYSTEM AND A METHOD OF DISTINCT SAMPLING FOR OPTIMIZING DISTINCT VALUE QUERY ESTIMATES

TECHNICAL FIELD OF THE INVENTION

The present invention is directed, in general, to database systems and, more specifically, to a distinct sampling system for use with a database that accommodates distinct value queries having predicates and a method of distinct sampling.

BACKGROUND OF THE INVENTION

Estimating the number of distinct values for some target attribute in a data set is a well-studied problem. The statistics literature refers to this as the problem of estimating the number of species or classes in a population. Estimates of the number of distinct values in a column are commonly used in query optimizers to select good query plans. In addition, histograms within the query optimizer commonly store the number of distinct values in each bucket, to improve their estimation accuracy. Distinct-values estimates are useful for network monitoring devices, in order to estimate the number of distinct destination Internet Protocol (IP) addresses, source-destination pairs, requested Universal Resource Locators (URLs), etc.

Estimating the number of distinct values in a data set is a special case of the more general problem of approximate query answering of distinct value queries, i.e., "count distinct" queries. Approximate query answering is becoming an indispensable means for providing fast response times to decision support queries over large data warehouses. Fast, approximate answers are often provided from small synopses of the data, such as samples, histograms, wavelet decompositions, etc. Commercial data warehouses are approaching 100 terabytes, and new decision support arenas, such as click stream analysis and IP traffic analysis, only increase the demand for high-speed query processing over the terabytes of data. Thus, it is crucial to provide highly-accurate approximate answers to an increasingly rich set of queries.

Distinct value queries are an important class of decision support queries, and good quality estimates for such queries may be returned to users as part of an online aggregation system or an approximate query answering system. Because the answers are returned to the users, the estimates must be highly-accurate (such as being within 10% or better with 95% confidence), and supported by error guarantees. Unfortunately, none of the previous work in approximate query processing provides fast, provably good estimates for common distinct values queries.

In addition, users are also requiring that systems that provide estimates for the distinct value queries that also have the capability to accommodate distinct value queries that have predicates. Predicates allow users to filter or target the distinct value queries to the specific estimates they need in order to operate more effectively. However, the distinct value queries having predicates must also be fast and highly-accurate. This can be difficult due to the terabytes of data the queries are being applied to.

Accordingly, what is needed in the art is a system for distinct sampling that can accommodate distinct value queries having predicates and overcomes the deficiencies of the prior art.

SUMMARY OF THE INVENTION

To address the above-discussed deficiencies of the prior art, the present invention provides, for use with a database that accommodates distinct value queries having predicates, a distinct sampling system, a method of distinct sampling and a distinct sampling middleware system employing the distinct sampling system and method. In one embodiment, the distinct sampling system includes a scanning subsystem configured to scan each row in the database for a distinct target attribute, employ a hash function to map the distinct target attribute to an attribute priority level, maintain random samples of each row based on a sample priority level and a sample size, and produce a distinct sample therefrom. The distinct sampling system further includes a distinct query estimator configured to receive the distinct value queries, cause the distinct value queries to be executed on the distinct sample to retrieve a result, and adjust the result to produce a distinct estimate therefrom. In another embodiment, the distinct sampling system may further include an incremental maintenance subsystem configured to update the distinct sample based on incremental updates to the database. For purposes of the present invention, the phrase "configured to" means that the device, the system or the subsystem includes the necessary software, hardware, firmware or a combination thereof to accomplish the stated task.

In another embodiment, the present invention provides a method of distinct sampling for use with a database that accommodates distinct value queries having predicates, the method includes: (1) scanning each row in the database for a distinct target attribute, (2) employing a hash function to map the distinct target attribute to an attribute priority level, and (3) maintaining random samples of each row based on a sample priority level and a sample size, and producing a distinct sample therefrom. The method further includes receiving the distinct value queries, causing the distinct value queries to be executed on the distinct sample to retrieve a result, and adjusting the result to produce a distinct estimate therefrom. The method may also include updating the distinct sample based on incremental updates to the database.

The present invention also provides, in one embodiment, a distinct sampling middleware system for use with a data warehouse that accommodates distinct value queries having predicates. The distinct sampling middleware system includes a rewriter subsystem and a distinct sampling system. The rewriter subsystem is configured to intercept the distinct value queries to the data warehouse and generate distinct value sample queries therefrom if the distinct value queries are associated with a distinct sample. The distinct sampling system, for use with the data warehouse and the rewriter subsystem, includes a scanning subsystem and a distinct query estimator. The scanning subsystem scans each row in the data warehouse for a distinct target attribute, employs a hash function to map the distinct target attribute to an attribute priority level, maintains random samples of each row based on a sample priority level and a sample size, and produces the distinct sample therefrom. The distinct query estimator receives the distinct value sample queries, causes the distinct value sample queries to be executed on the distinct sample to retrieve a result, and adjusts the result to produce a distinct estimate therefrom. The distinct sampling system may also include an incremental maintenance subsystem that updates the distinct sample based on incremental updates to the data warehouse.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which:

FIG. 4 illustrates an exemplary call center system performance report constructed according to the principles of the present invention.

DETAILED DESCRIPTION

Figure 1:
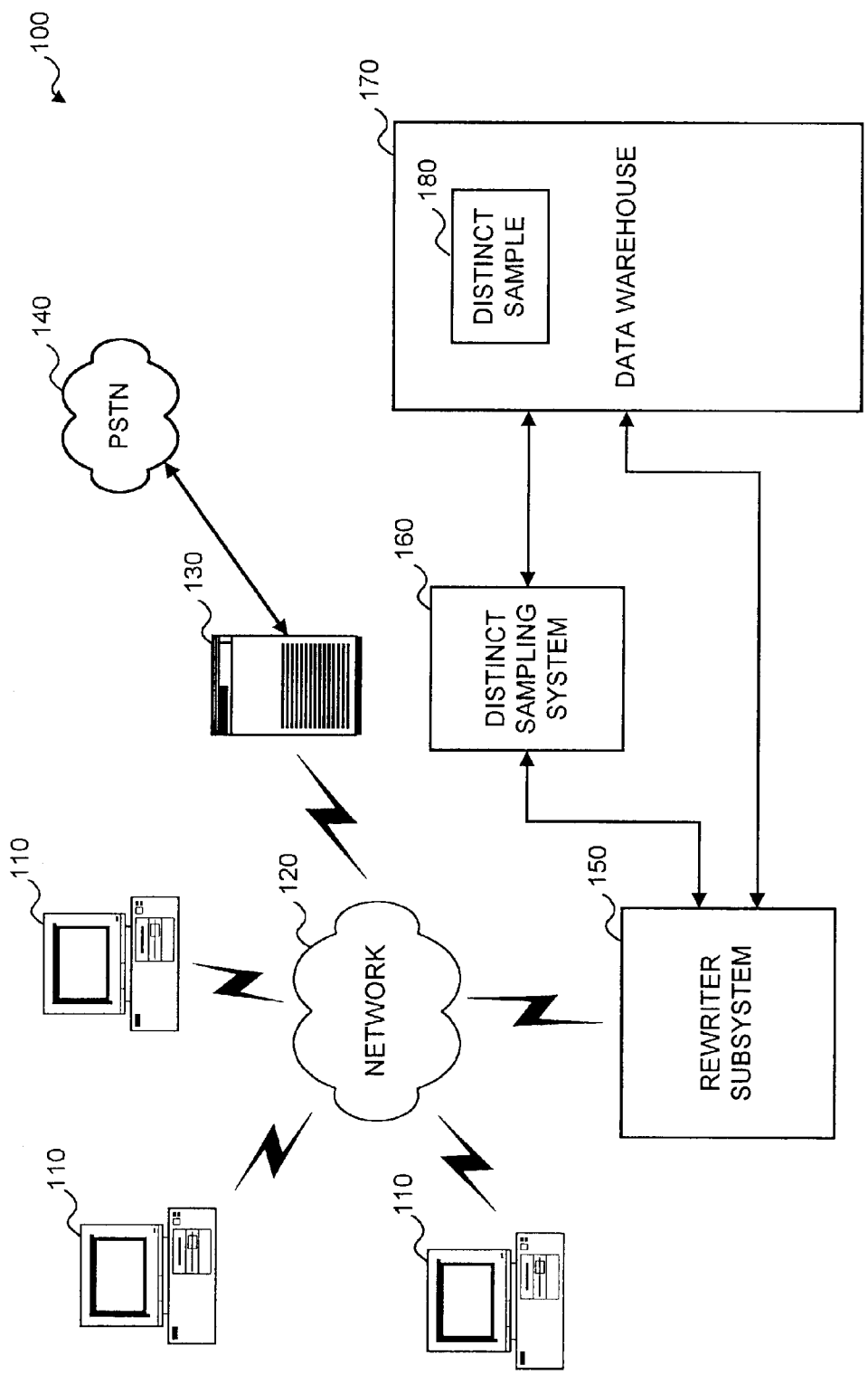
FIG. 1 illustrates a block diagram of an embodiment of a data warehouse network constructed in accordance with the principles of the present invention.

Referring initially to FIG. 1, illustrated is a block diagram of an embodiment of a data warehouse network, generally designated 100, constructed in accordance with the principles of the present invention. The data warehouse network 100 is generally designed to allow multiple systems to retrieve and update information contained in a data warehouse 170 over a network 120. In one embodiment, the data warehouse 170 may be embodied within a conventional data server or servers and includes a database that is configured to employ queries to retrieve and update information contained within the database. Additionally, the data warehouse 170 may employ session-based event recording having a session id associated with each event recorded in the data warehouse 170. The network 120 is a conventional digital network and may include a Local Area Network ("LAN"), a Wide Area Network ("WAN"), an Intranet, an Extranet, the Internet, the World Wide Web or a combination thereof.

In the illustrated embodiment, the data warehouse network 100 includes at least one client system 110 that employs the network 120 to send query requests to and receives results from the data warehouse 170. The client system 110 may be a conventional computer system that is configured to allow query requests to be generated via a user interface and/or generated by an application program running on the client system 110. The client system 110 may also send a distinct value query request and/or a distinct value query request having a predicate to the data warehouse 170. For example, to determine how many distinct customers have placed orders this year, the distinct value query may take the form of "select count (distinct o_custkey) from orders where o_orderdate>='2002-01-01'." In this example, the distinct value query is requesting the number of unique customers from the orders table. The distinct value query also applies a predicate of "where o_orderdate>='2002-01-01'," to limit the result to only unique customers since the start of the year. One skilled in the pertinent art is familiar with the use of distinct value queries and distinct value queries having predicates.

The data warehouse network 100, in one embodiment, includes a distinct sampling system 160 that may be embodied in software and/or hardware within the data warehouse 170 or within a separate computer system that is capable of communicating with the data warehouse 170. The distinct sampling system 160 is configured to scan the database for selected distinct target attributes, map the distinct target attributes to an attribute priority level, maintain random samples of each row based on a sample priority level and a sample size, and produce a distinct sample 180 therefrom. Depending upon the sample size used for a particular distinct target attribute, a distinct value query of the distinct sample 180 can provide approximate answers quickly while maintaining a low relative error. In addition, since the distinct sample 180 contains not only random samples of the distinct target attribute but also the rows associated with the distinct target attribute, the distinct value queries may advantageously include predicates to limit or restrict the queries. Of course, however, the present invention is not limited to only one distinct sample 180 for one distinct target attribute. In other embodiments, the present invention may create a distinct sample for each distinct target attribute.

The distinct sampling system 160 may also perform incremental maintenance of the distinct sample 180 by updating the distinct sample 180 based upon incremental updates to the data warehouse 170. The distinct sampling system 160 is further configured to receive the distinct value queries, cause the distinct value queries to be executed on the distinct sample 180 to retrieve a result, and adjust the result to produce a distinct estimate therefrom. In one embodiment, the result is adjusted based upon the number of remaining samples within the distinct sample 180, which represents the percentage of possible values that could occur in the database table for that particular distinct target attribute.

The goal in creating a distinct sample is to collect and store information on database tables that will permit highly-accurate estimates for distinct values queries on these tables. For simplicity, the description will focus on a single distinct target attribute (target-attr) from a single table (rel), as in the distinct value query illustrated in Table 1. For purposes of discussion, it will be assumed that there is an a priori bound on the storage set aside for the distinct sample, e.g., space for a sample of 10K rows from a large table. One skilled in the pertinent art should know that the present invention is not limited to only one distinct target attribute and sample size. Other embodiments may have any number of distinct target attributes and different sample sizes for each distinct target attribute.

TABLE 1

Distinct Value Query Template select count (distinct target-attr)
from rel
where P If samples were taken uniformly from the rows in rel, as a traditional sample would, it would be likely that the distinct sample would be missing attribute values that occur only rarely in rel. Instead, the sample needs to ensure that all distinct values are represented in the sample. For attributes with many distinct values, however, there may not be room to store all the distinct values within the given storage bound. In such cases, the distinct sample should contain a uniform random sample of the distinct values. This has advantages detailed below. Moreover, in order to know how to scale the answers produced from this uniform sample, the sampling rate used should be maintained.

Two problems arise. First, the first occurrence of a value should be detected as the table is scanned. For each row, the current sample can be checked to see if the row has a value for the target-attr that is already in the sample. However, if there is insufficient storage to keep track of all the distinct values, something has to be done if the value is not in the current sample. In addition, there may be no way of knowing if this is the first time the value has been seen or if it has been seen but it was previously ignored (and hence for consistency it should be ignored again). Adding the value to the sample with some probability would not produce a uniform sample of the distinct values, and, in fact, it would be quite biased toward frequently occurring values. On the other hand, ignoring the value is not good because this would completely bias the sample toward values occurring early in the table. Second, even if the first occurrence of a value could be detected, there needs to be some method of indicating what the sampling rate was used to determine if a value should be included in the sample. The sampling rate depends upon the total number of distinct values maintained in the distinct sample, which is the problem that is trying to be solved in the first place.

Moreover, the goal in creating a distinct sample is not only to produce an estimate of the total number of distinct values, but also estimate distinct values queries over subsets of the data selected by subsequent query predicates. Thus, simply maintaining all (or a sample of) the distinct values themselves is insufficient, because it does not permit proper accounting for subsequent predicates, which may often be on other attributes.

The present invention advantageously overcomes the above described problems in creating a sample. In one embodiment of the present invention, a distinct sample has the following: (1) each distinct target-attr value in the table rel is equally likely to be in the sample; and (2) for each distinct value v in the sample, there is: (a) a count of the number of times v appears in the entire table scanned thus far, and (b) either all the rows in the table with target-attr=v, or if there are more than t such rows, a uniform sample of t of these rows. The bound t is the maximum number of rows to retain for a single distinct value.

TABLE 2

Distinct Sampling Algorithm

```
Distinct Sampling( space bound B, valSampSize t)
1.   initialize l := 0, S := 0
2.   select the hash function die-hash
3.   do while(more rows R to scan) {
4.       die-level := die-hash(v), for target-attr value v in R
5.       if (die-level ≧ l) {
6.           if(v appears 0 to t–1 times in S) {
7.               add row R to S
8.               if(v now appears t times)
9.                   add to S a dummy row for v with c_v := t
             }
10.          else{   // v appear exactly t times
11.              retrieve the count c_v from the dummy row for v
12.              increment c_v
13.              with probability t/c_v, add row R to S
```

TABLE 2-continued

Distinct Sampling Algorithm

```
                 and evict a random row with value v from S
             }
14.      if(|S|≧B) {       //S is full
15.          evict from S all rows with target-attr values w
                 such that the die-hash(w) = l
16.          increment l
         }
     }
}
```

The distinct sampling algorithm is illustrated in Table 2. The algorithm has two parameters: the bound B on the available sample size (the number of rows in total) and the bound t on the maximum number of rows to retain for a single distinct value. The algorithm operates as follows. There is a level (also called priority level) that is associated with the procedure that is initially set to 0 and is incremented each time the sample bound B is reached. Each value in the domain is mapped to a random level, called its die-level (or attribute priority level). A hash function is used, so that each time a given value occurs in the table, the value maps to the same die-level (Step 4). As the table is scanned, the system retains only the rows in the distinct sample S whose target-attr value's die-level is at least as large as the current level l (Step 5). Eventually, either the system reaches the end of the table or exhausts all of the available space for S. In the latter case, the system creates more room in S by evicting all the rows with die-level l and then incrementing l (Steps 14–16). The system then continues scanning the table and performing the steps illustrated in Table 3 until there are no more rows to be scanned.

The invariant maintained throughout is that S contains all the distinct values appearing in the scanned portion of the table whose die-level is at least l, and no other distinct values. Because levels for distinct values are chosen at random, S contains a uniform sample of the distinct values in the scanned portion. Of course, S may have many rows duplicating the same values depending upon the size of B and t.

To expedite the sampling and subsampling, the hash function (called die-hash) maps the value domain onto a logarithmic range, such that each distinct value gets mapped to j with probability $2^{-(j+1)}$ (i.e., mapped to 0 with probability $$\frac{1}{2},$$

to 1 with probability $$\frac{1}{4},$$

etc.). Thus, a current level of l indicates that only a $2^{-l}$ fraction of the domain is currently eligible for S. It follows that if S is the Distinct Sample and l is the current level after the entire table has been scanned, then the number of distinct values in the table can be estimated as $2^l$ times the number of distinct values in S.

In the description of the algorithm thus far, it had been implied that the system retains in S all rows whose target-attr value's die-level is at least 1. However, doing so could swamp S with many rows having the same distinct value, leaving little room for other distinct values. Instead, a limit, valSampSize=t, may be placed on the number of rows with the same value. For values that reach that limit, reservoir sampling is used to maintain a uniform sample of the t rows with that value (Steps 10–13). Reservoir sampling requires knowing the number of rows with the same value thus far (whether currently in the Distinct Sample or not). Thus, the system stores a dummy row in the Distinct Sample that contains the exact number of occurrences of that particular value thus far (Step 9).

An example algorithm execution is depicted in Table 3, for a 12 row table. There are three distinct values in the resulting Distinct Sample (2, 3, and 9), so the number of distinct values in this table is estimated as $3 \cdot 2^1 \equiv 6$, which matches the actual number of distinct values.

TABLE 3

Example of the Distinct Sampling Algorithm for B = 7 and t = 3.

| Rows Scanned | | | Result | |
|---|---|---|---|---|
| row | attr value | die level | distinct sample | level l |
| $R_1$ | 5 | 0 | $\{R_1\}$ | 0 |
| $R_2$ | 3 | 2 | $\{R_1, R_2\}$ | 0 |
| $R_3$ | 3 | 2 | $\{R_1, R_2, R_3\}$ | 0 |
| $R_4$ | 8 | 0 | $\{R_1, R_2, R_3, R_4\}$ | 0 |
| $R_5$ | 2 | 1 | $\{R_1, R_2, R_3, R_4, R_5\}$ | 0 |
| $R_6$ | 7 | 0 | $\{R_1, R_2, R_3, R_4, R_5, R_6\}$ | 0 |
| $R_7$ | 8 | 0 | $\{R_2, R_3, R_5\}$ | 1 |
| $R_8$ | 3 | 2 | $\{R_2, R_3, R_5, R_8, c_3 = 3\}$ | 1 |
| $R_9$ | 3 | 2 | $\{R_2, R_5, R_8, R_9, c_3 = 4\}$ | 1 |
| $R_{10}$ | 5 | 0 | $\{R_2, R_5, R_8, R_9, c_3 = 4\}$ | 1 |
| $R_{11}$ | 3 | 2 | $\{R_2, R_5, R_8, R_{11}, c_3 = 5\}$ | 1 |
| $R_{12}$ | 9 | 1 | $\{R_2, R_5, R_8, R_{11}, R_{12}, c_3 = 5\}$ | 1 |

Setting the value sample size parameter t (valSmpSize) can depend upon the types of the distinct value queries. For distinct value queries without predicates, or distinct value queries with predicates only on the target attribute, the valSampSize t could be set to 1, resulting in the best performance for distinct sampling on such queries. This is due to the available storage that would be devoted entirely to distinct values and not to multiple rows with the same value. However, one goal of the present invention is to estimate distinct value queries for more general predicates. A good estimate is to set t to be the minimum of (i) twice the inverse of the minimum predicate selectivity, q, for queries of interest (e.g., 100 for predicates down to 2%) and (ii) 2% of the sample size B:

$$t = \min(2/q, B/50) \quad (1)$$

Because the system may store all rows for a value, up to t, it is known precisely whether any of the rows with this value satisfy the predicate. When the number of rows with this value exceeds t, the distinct sample has a uniform sample of these rows, of size t. Thus, an expected q·t of these rows will satisfy the predicate, where q is the selectivity of the predicate over all the table rows with this value. When $$t \geq \frac{2}{q},$$

it is expected that at least two rows in the sample will satisfy the predicate. On the other hand, if no rows satisfy the predicate, then no rows in the sample will satisfy the predicate, as desired for accurate estimation.

Concerning the hash function die-hash, assume for simplicity that the target-attr domain is the set of integers in $[0 \ldots D-1]$, where D is a power of two. Let $m = \log_2 D$. For every value v, die-hash (v) is a mapping from $[0 \ldots D-1]$ to $[0 \ldots m]$, such that, independently for each v, $$\forall l \in [0 \ldots m-1]: Pr\{\text{die-hash}(v) = l\} = 2^{-(l+1)} \quad (2)$$

Three parameters define a particular die-hash: $\alpha$, $\beta$, and hashmod. Hashmod is set to be D. We choose $\alpha$ uniformly at random from $[1 \ldots \text{hashmod}-1]$ and $\beta$ uniformly at random from $[0 \ldots \text{hashmod}-1]$. For any x in $[0 \ldots \text{hashmod}-1]$, define LeadZeros(x) to be the number of leading zeros in x when viewed as a $\log_2(\text{hashmod})$-bit number. Then for each value v encountered during the scan, die-hash is computed as:

$$\text{die-hash}(v) = \text{LeadZeros}((\alpha v + \beta) \bmod \text{hashmod}) \quad (3)$$

This hash function was used in "The Space Complexity of Approximating the Frequency Moments," by N. Alon, et al., Proc. 28th ACM Symposium on the Theory of Computing, pages 20–29 (May 1996), which is incorporated herein by reference, where the hash function was shown to satisfy Equation 2 and pairwise independence among the values v.

To obtain an estimate, given a stored distinct sample S and having a current level l, a distinct value query is executed on the distinct sample S. The result is multiplied by the scale factor $2^l$, ignoring the dummy rows. The accuracy of the estimates are dependent on the selectivity of the predicates in the queries of interest, in a somewhat nontrivial way. More specifically, let V be the set of distinct target-attr values in the relation, and for any predicate P, let $V_p \subseteq V$ be the set of distinct values satisfying P. The target selectivity is defined as $q_{tar} \leq 1$, to be $|V_p|/|V|$, i.e., the number of distinct values satisfying P divided by the total number of distinct values in the relation. Next, consider only values v in $V_p$, and define the value selectivity for v, $q_{val}(v) \leq 1$, to be the number of rows with target-attr value v satisfying P divided by the total number of rows with value v in the relation. (Note that $q_{val}(v) > 0$ because $v \in V_p$.) Then, let the overall value selectivity, $q_{val} \leq 1$, be the median of the $q_{val}(V)$. Finally, let Q be the set of all distinct value queries matching the template in Table 1 for a given target-attr, with target selectivity at least $$q^*_{tar}$$

and value selectivity at least $$q^*_{val}.$$

Then, for any positive $\in \leq 1$ and $\delta \leq 1$, a single Distinct Sample for the target-attr, with $$t = \Theta\left(\frac{\log(1/\delta)}{q_{val}^*}\right)$$

and $$B = \Theta\left(\frac{t \cdot \log(1/\delta)}{q_{tar}^* \cdot \varepsilon^2}\right),$$

provides an estimate for any query in Q such that the estimate is guaranteed to be within a relative error $\epsilon$ with probability $1-\delta$. Distinct Sampling and the accuracy of distinct value queries on a distinct sample are discussed in more detail in "Distinct Sampling for Highly-Accurate Answers to Distinct Values Queries and Event Reports," by Phillip B. Gibbons, Proceedings of the 27$^{th}$ VLDB Conference, Rome, Italy, September 2001, and is incorporated herein by reference.

Referring back to FIG. 1, the data warehouse network 100 may also include a rewriter subsystem 150. The rewriter subsystem 150 may be embodied in software, hardware, firmware or a combination thereof and is configured to intercept distinct value queries to the data warehouse 170 and generate distinct value sample queries therefrom if the distinct value queries are associated with the distinct sample 180. The rewriter subsystem 150 sends the distinct value sample queries to the distinct sampling system 160 to be executed on the distinct sample 180. In one embodiment, the rewriter subsystem 150 may receive the incremental updates to the data warehouse 170 from the network 120 and send the incremental updates to the data warehouse 170. The rewriter subsystem 150 may also send the incremental updates to the distinct sampling system 160 in order to maintain the distinct sample 180.

In the illustrated embodiment, the data warehouse network 100 may include a call center system 130 that receives and makes calls to customers via a public switched telephone network 140. The call center system 130 may be a conventional call center that records events to the data warehouse 170 based on a session id. For example, once a customer calls in, an event record may be written to the data warehouse 170 with a time stamp and a session id assigned to that particular customer. Event records may be written for the menu items selected, time on hold, the agent that pick up the call, time talking to the agent and others. All of these records are written to the data warehouse 170 with a time stamp and the assigned session id.

One skilled in the art knows that call centers are high volume, session-based event recording environments. Fast and highly-accurate answers are needed to efficiently operate the centers. Due to the high-volume, performing queries on the entire database may take several minutes or tens of minutes. This is unacceptable for a call center that may require reports to be generated every minute. The present invention, in one embodiment, addresses this problem by using the session id as the distinct target attribute and the distinct sampling system 160 may produce the distinct sample 180 for the session id attribute. Using the session id, distinct value queries may be made on the distinct sample 180 to produce pre-canned reports. The distinct value queries may advantageously retrieve all of the records for particular session ids from the distinct sample to allow report calculations to be performed, such as average speed to answer. See FIG. 4 for an exemplary call center system performance report. Since the distinct sample 180 is significantly smaller than the entire database and the distinct sample 180 contains a highly accurate random sampling, highly-accurate approximate answers may be obtained fast.

Figure 2:
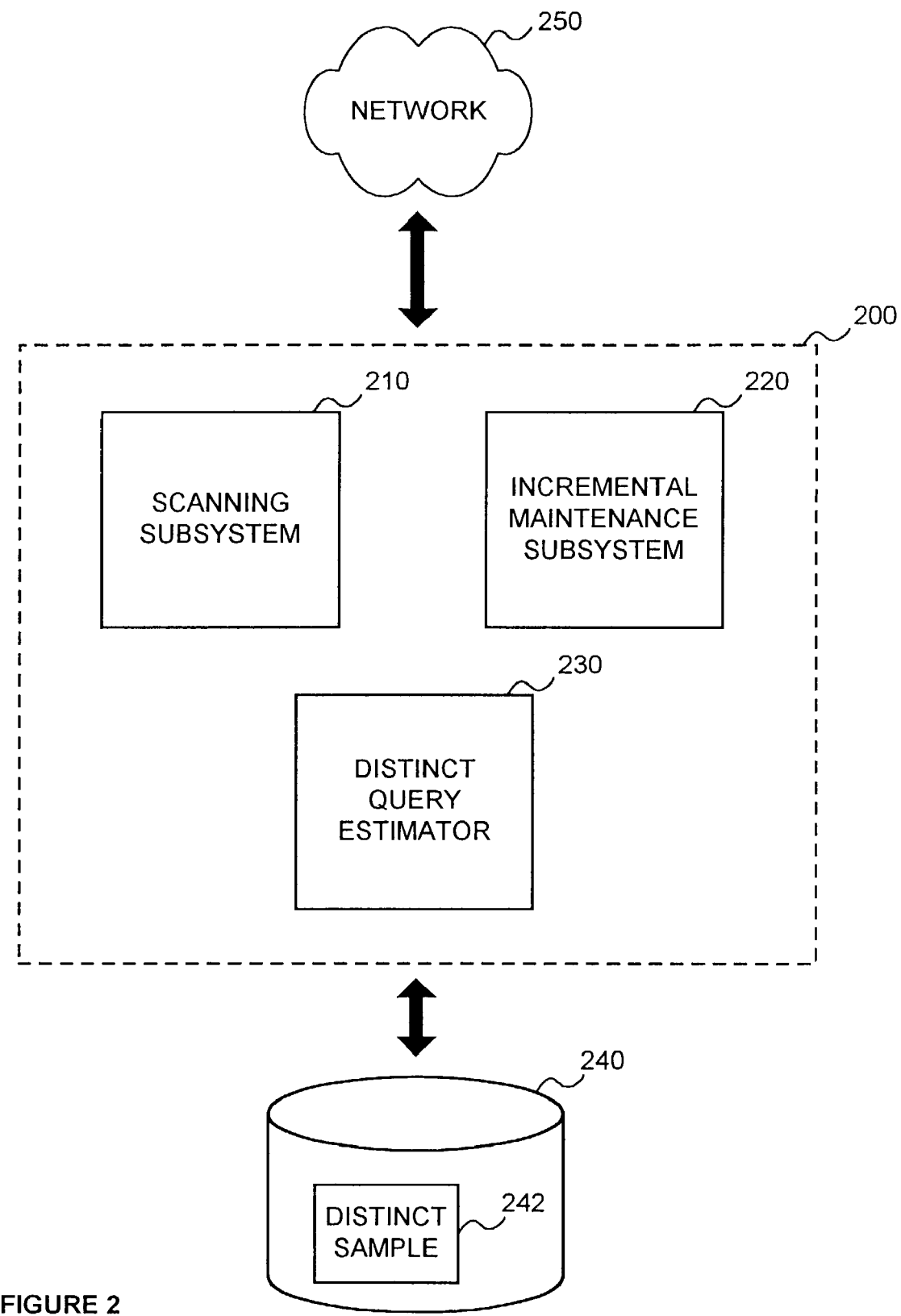
FIG. 2 illustrates a block diagram of an embodiment of a distinct sampling system constructed in accordance with the principles of the present invention.

Turning now to FIG. 2, illustrated is a block diagram of an embodiment of a distinct sampling system, generally designated 200, constructed in accordance with the principles of the present invention. The distinct sampling system 200 may be embodied in software, hardware, firmware or a combination thereof within a database 240 or within a separate computer system that is capable of communicating with the database 240. The distinct sampling system 200, in the illustrated embodiment, includes a scanning subsystem 210, an incremental maintenance subsystem 220 and a distinct query estimator 230.

The scanning subsystem 210 is configured to scan each row in a database 240 for a distinct target attribute. In another embodiment, the scanning subsystem 210 scans each row for multiple distinct target attributes. The scanning subsystem 210 also employs a hash function to map the distinct target attribute to an attribute priority level. The hash function may be an exponential distribution hash function having a probability that a particular value of the distinct target attribute is assigned a value j of $2^{(j+1)}$. Other embodiments of the present invention may employ other hash functions that map the value domain onto a logarithmic range.

The scanning subsystem 210 also maintains random samples of each row that contains the distinct target attribute based on a sample priority level and a sample size, and produce a distinct sample 242 therefrom. The scanning subsystem 210 compares the attribute priority level of the distinct target attribute to the sample priority level to determine if the row is to be maintained as part of the random samples. In one embodiment, the sample priority level is a minimum priority level. If the attribute priority level is equal to or greater than the minimum priority level, the row containing that distinct target attribute is maintained. The scanning subsystem 210 is further configured to increment the minimum priority level when the number of random samples reaches the sample size and remove the random samples having an attribute priority level lower than the minimum priority level. In yet another embodiment, the scanning subsystem 210 may employ different priority level schemes in determining whether to maintain particular distinct target attributes and the associated row in the random samples.

In addition, the scanning subsystem 210 may select the random samples based on the sample priority level, the sample size and a distinct value limit. The distinct value limit specifies the maximum number of random samples to be maintained for each value of the distinct target attribute. For example, in Table 3, the distinct value limit (illustrated as L) is set to 3. This means that the scanning subsystem 210 would maintain at most 3 random samples for each distinct value in the database 240. In a related embodiment, the scanning subsystem 210 may also maintain a dummy row indicating the number occurrences for a particular distinct target attribute that exceeds the distinct value limit. For example, the distinct value "3" exceeded the distinct value limit of 3 and a dummy row was maintained that indicated the number times the distinct value "3" occurred in the scan of the database.

The incremental maintenance subsystem 220 is configured to update the distinct sample 242 created by the scanning subsystem 210 based on incremental updates to the database 240 via a network 250. The incremental updates, in one embodiment, may be received from the network 250 and passed to the database 240. In another embodiment, duplicates of or information about the incremental updates may be sent to the distinct sampling system 200 from another system via the network 250, such as the rewriter subsystem 150 illustrated in FIG. 1.

If a row is added to the database 240, the incremental maintenance subsystem 220 updates the distinct sample 242 using the same methods use by the scanning subsystem 210 to create the distinct sample 242. If a row was deleted from the database 240, the incremental maintenance subsystem 220 would determine if the distinct target attribute value is actually maintained in the distinct sample 242. If the distinct target attribute value is not in the distinct sample 242, the deletion request would be ignored. If the distinct target attribute value is in the distinct sample 242, the incremental maintenance subsystem 220 would then delete that particular sample row from the distinct sample 242. In a related embodiment that employs a distinct value limit, the incremental maintenance subsystem 220 would decrement the count of samples for that particular distinct target attribute value. If the count of samples for any distinct value of a distinct target attribute falls to a preset limit below the distinct value limit, the incremental maintenance subsystem 220 causes the scanning subsystem 210 to re-scan the database 240 to recreate the distinct sample 242.

The distinct query estimator 230 is configured to receive distinct value queries and cause the distinct value queries to be executed on the distinct sample 242 to retrieve a result. The distinct query estimator 230 may receive the distinct value queries from system coupled to the network 250. In another embodiment, a system or software program may have intercepted the original distinct value queries and generated distinct value sample queries that are to be executed on the distinct sample 242. Upon receiving the result from the distinct value query, the distinct query estimator 230 adjusts the result to produce a distinct estimate therefrom. The distinct query estimator 230 would then send the distinct estimate back to the requestor.

The distinct query estimator 230 may be further configured to adjust the result by multiplying at least one value within the result by a reciprocal of a number of remaining samples within the distinct sample 242. For example, if the distinct sample 242 has a sample priority level of 3, the distinct sample 242 would contain random samples having an attribute priority level of 3 or higher. This would mean that the remaining samples in the distinct sample 242 is expected to be ⅛ of the total number of distinct values in the database 240. To produce the distinct estimate, the result would be multiplied by the reciprocal of the remaining samples. For this example the value would be multiplied by 8. The distinct estimate is valid if the distinct sample 242 contained a sufficiently large sample. In addition, the sample size is dependent upon the selectivity of the predicate of the distinct value queries. If the answer for a predicate would hold for 1% of the database table, then the distinct sample would require a sample size larger than the sample size for a predicate that would hold for 10% of the database table.

Figure 3:
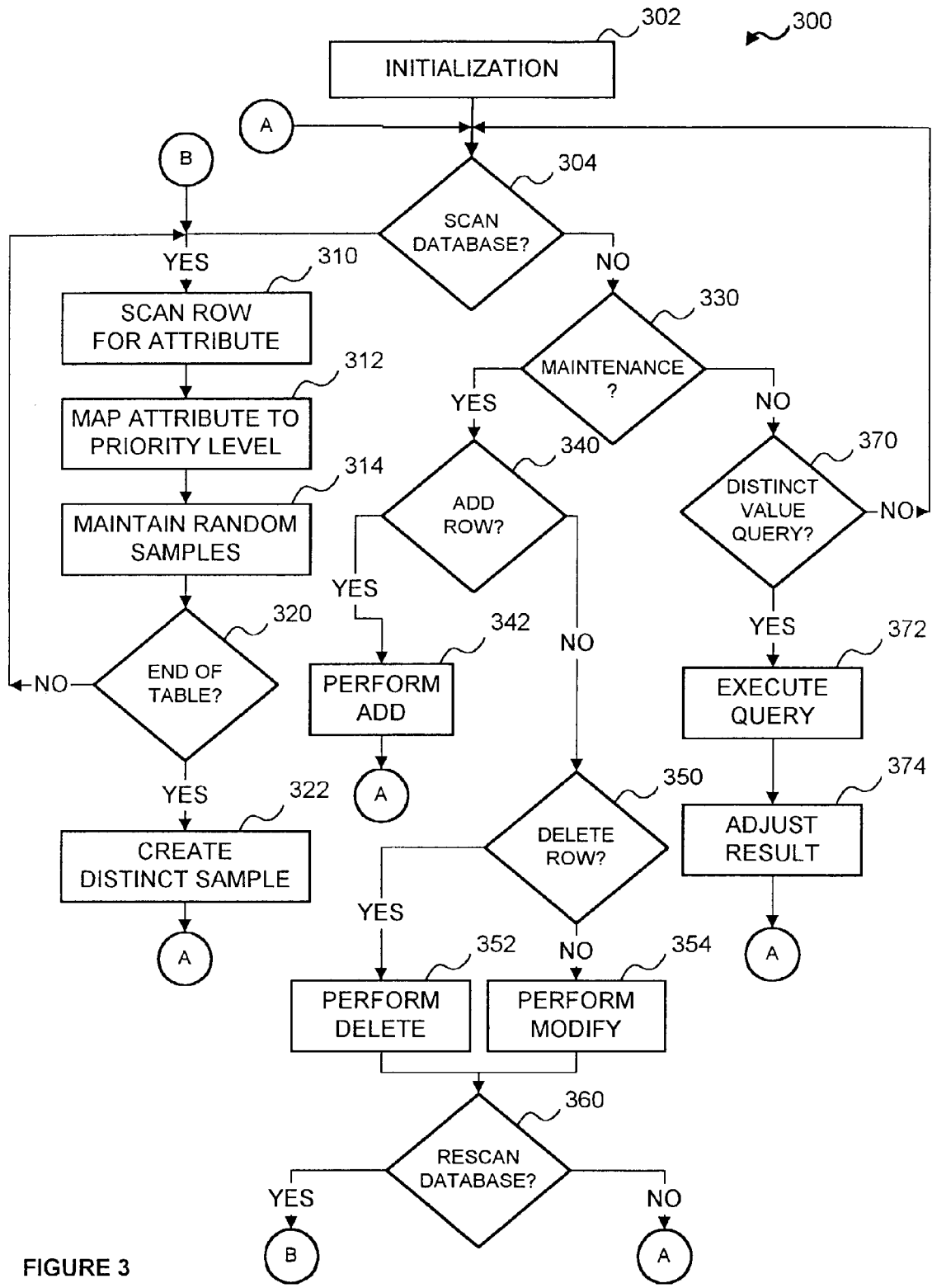
FIG. 3 illustrates a flow diagram of an embodiment of a method of distinct sampling for use with a database that accommodates distinct value queries having predicates conducted according to the principles of the present invention.

Turning now to FIG. 3, illustrated is a flow diagram of an embodiment of a method of distinct sampling, generally designated 300, for use with a database that accommodates distinct value queries having predicates conducted according to the principles of the present invention. In FIG. 3, the method 300 first performs initialization in a step 302.

After initialization, the method 300 determines if it is to scan the database to create a distinct sample for a distinct target attribute in a decisional step 304. If the method 300 determined that the database is to be scanned, the method 300 then scans a row from the database for the distinct target attribute in a step 310. The method 300 then employs a hash function to map the distinct target attribute to an attribute priority level in a step 312. In one embodiment the method 300 may employ a hash function that is an exponential distribution hash function having a probability that a particular value of the distinct target attribute is assigned a value j of $2^{-(j+1)}$.

Next, the method 300 maintains random samples of each row containing the distinct target attribute based on a sample priority level and a sample size in a step 314. For example, the method 300 would compare the attribute priority level to the sample priority level and based on whether the attribute priority level is greater than, equal to, or less than, the method 300 would keep that particular row. In one embodiment, the method 300 may use a sample priority level that is a minimum priority level. The attribute priority level would be compared to the minimum priority level and if the attribute priority level is greater than or equal to the minimum priority level, the row would be kept in the random samples. In addition, if the number of random samples maintained reaches the sample size, the method 300 would remove the random sample having an attribute priority level lower than the minimum priority level. Then, the method 300 would increment the minimum priority level.

The method 300 then determines if the end of the database table has been reached in a decisional step 320. If the end of the database table has not been reached, the method 300 returns to scan another row from the database table in the step 310. If the method 300 did reach the end of the database table, the method 300 then creates the distinct sample in a step 322. In one embodiment, the method 300 may create the distinct sample in the database as searchable database table. The method 300 then returns to determine if the database is to be scanned or perform some other function in the decisional step 304.

If the method 300 determined that it is not scanning the database in the decisional step 304, the method 300 then determines if maintenance is to be performed on the distinct sample due to incremental updates to the database in a decisional step 330. If maintenance is to be performed, the method 300 then determines if the incremental update added a row to the database in a decisional step 340. If the incremental update added a row, then the method 300 would perform an add to the distinct sample in a step 342. The method 300 adds the row to the distinct sample by performing steps similar to steps 310 through 314 on the row that was added. The method 300 then returns to determine if the database is to be scanned or perform some other function in the decisional step 304.

If the method 300 determined that the incremental update did not add a row to the database in the decisional step 340, the method 300 then determines if the incremental update deleted a row from the database in a decisional step 350. If the incremental update deleted a row from the database, the method 300 performs a delete to the distinct sample in a step 352. If the row that was deleted from the database is not in the distinct sample, the method 300 ignores the incremental update. If the row that was deleted from the database is in the distinct sample, the method 300 deletes the row from the distinct sample. The method 300 may also decrement a count of the number random samples kept for that particular distinct value. The method 300 may then determine if the database is to be re-scanned in a decisional step 360. If the count of the number of random samples kept for a particular distinct value falls to a preset limit below a distinct value limit, the method 300 would then start a re-scan of the database in the step 310. Otherwise, the method 300 returns to determine the next function to be performed in the decisional step 304.

If the method 300 determined that the incremental update did not delete a row from the database in the decisional step 350, the method 300 then performs a modification based upon the incremental update in a step 354. If the incremental update modified the distinct target attribute that was maintained in the distinct sample, the method 300 would perform the similar functions as performed in the deletion of a row in the step 352, and then perform similar functions as in the addition of a row in the step 342. Next, the method 300 would re-scan the database if needed in the decisional step 360. If the incremental update modified a field in the row that was maintained in the distinct sample, the method 300 would modify that particular field in the distinct sample and then determine if the database is to be re-scanned in the decisional step 360. If the incremental update modified any part of a row that is not maintained in the distinct sample, the method ignores the incremental update and then determines if the database is to be re-scanned in the decisional step 360.

If the method 300 determined that no maintenance is to be performed in the decisional step 330, the method 300 then determines if there is a distinct value query to be executed in a decisional step 370. If a distinct value query is to be executed, the method 300 receives the distinct value query and causes the distinct value query to be executed on the distinct sample to retrieve a result in a step 372. Upon receiving the result, the method 300 then adjusts the result to produce a distinct estimate in a step 374. Next, the method 300 returns the distinct estimate to whomever sent the distinct value query. The method 300 then returns to determine the next function to be performed in the decisional step 304.

One skilled in the art should know that the present invention is not limited to processing only one type of function at a time. The present invention and method may perform multiple functions at the same time. In addition, the present invention is not limited to creating only one distinct sample for a particular distinct target attribute at a time. In other embodiments, the present invention and method may create multiple distinct samples for given distinct target attributes at the same time and in one scanning pass of the database. Also, other embodiments of the present invention may have additional or fewer steps than described above.

While the methods disclosed herein have been described and shown with reference to particular steps performed in a particular order, it will be understood that these steps may be combined, subdivided, or reordered to form an equivalent method without departing from the teachings of the present invention. Accordingly, unless specifically indicated herein, the order and/or the grouping of the steps are not limitations of the present invention.

Turning now to FIG. 4, illustrated is an exemplary call center system performance report constructed according to the principles of the present invention. The call center system performance report provides an amount of work offered, an amount of work handled, an amount of work that was abandoned, a rate of the amount of work that was abandoned as a percentage, an average pre-processing time of a call, an average speed to answer the call and an average amount of time to handle the call. Employing this information, the call center or an administrator can examine the efficiency of the call center and make appropriate changes if needed. In another embodiment, the average speed to answer the call may be used for announcement to the calling customer. In yet another embodiment, the call center system performance report may be employed by a predictive dialer to decide when to make the next call. One skilled in the pertinent art should know that the present invention is not limited to the information described above. Other embodiments may include different system performance parameters and report additional information.

Although the present invention has been described in detail, those skilled in the art should understand that they can make various changes, substitutions and alterations herein without departing from the spirit and scope of the invention in its broadest form.

What is claimed is:

1. A computer implemented distinct sampling system for use with a database that accommodates distinct value queries having predicates, comprising:
   a scanning subsystem configured to scan each row in said database for a distinct target attribute, employ a hash function to map said distinct target attribute to an attribute priority level, maintain random samples of said each row based on a sample size and a comparison of said attribute priority level and a sample priority level, and produce a distinct sample therefrom; and
   a distinct query estimator configured to receive said distinct value queries, cause said distinct value queries to be executed on said distinct sample to retrieve a result, and adjust said result to produce a distinct estimate therefrom.

2. The distinct sampling system as recited in claim 1 wherein said hash function is an exponential distribution hash function having a probability that a particular value of said distinct target attribute is assigned a value j of $2^{-(j+1)}$.

3. The distinct sampling system as recited in claim 1 wherein said sample priority level is a minimum priority level and said scanning subsystem is further configured to increment said minimum priority level when the number of said random samples reaches said sample size and remove said random samples having said attribute priority level lower than said minimum priority level.

4. The distinct sampling system as recited in claim 1 wherein said random samples are selected based on said sample priority level, said sample size and a distinct value limit, wherein said distinct value limit specifies the maximum number of said random samples to be maintained for each value of said distinct target attribute.

5. The distinct sampling system as recited in claim 1 further comprising an incremental maintenance subsystem configured to update said distinct sample based on incremental updates to said database.

6. The distinct sampling system as recited in claim 5 wherein said incremental maintenance subsystem is further configured to remove a selected random sample from said distinct sample when a deletion or modification request to said database regards said distinct target attribute, and cause said scanning subsystem to re-scan said database for said distinct target attribute when the number of said random samples for a particular value of said distinct target attribute falls to a preset limit below a distinct value limit, wherein said distinct value limit specifies the maximum number of said random samples to be maintained for each value of said distinct target attribute.

7. The distinct sampling system as recited in claim 1 wherein said distinct query estimator is further configured to adjust said result by multiplying at least one value within said result by a reciprocal of a number of remaining samples within said distinct sample.

8. A computer implemented method of distinct sampling for use with a database that accommodates distinct value queries having predicates, comprising:
scanning each row in said database for a distinct target attribute;
employing a hash function to map said distinct target attribute to an attribute priority level;
maintaining random samples of said each row based on a sample size and a comparison of said attribute priority level and a sample priority level, and producing a distinct sample therefrom; and
receiving said distinct value queries, causing said distinct value queries to be executed on said distinct sample to retrieve a result, and adjusting said result to produce a distinct estimate therefrom.

9. The method as recited in claim 8 wherein said hash function is an exponential distribution hash function having a probability that a particular value of said distinct target attribute is assigned a value j of $2^{-(j+1)}$.

10. The method as recited in claim 8 wherein said sample priority level is a minimum priority level and said maintaining samples further comprises incrementing said minimum priority level when the number of said random samples reaches said sample size and removing said random samples having said attribute priority level lower than said minimum priority level.

11. The method as recited in claim 8 wherein said maintaining random samples comprises selecting based on said sample priority level, said sample size and a distinct value limit, wherein said distinct value limit specifies the maximum number of said random samples to be maintained for each value of said distinct target attribute.

12. The method as recited in claim 8 further comprising updating said distinct sample based on incremental updates to said database.

13. The method as recited in claim 12 wherein said updating said distinct sample further comprises removing a selected random sample from said distinct sample when a deletion or modification request to said database regards said distinct target attribute, and causing said scanning subsystem to re-scan said database for said distinct target attribute when the number of said random samples for a particular value of said distinct target attribute falls to a preset limit below a distinct value limit, wherein said distinct value limit specifies the maximum number of said random samples to be maintained for each value of said distinct target attribute.

14. The method as recited in claim 8 wherein said adjusting said result further comprises adjusting said result by multiplying at least one value within said result by a reciprocal of a number of remaining samples within said distinct sample.

15. A distinct sampling middleware system implemented on a computer for use with a data warehouse that accommodates distinct value queries having predicates, comprising:
a rewriter subsystem tat intercepts said distinct value queries to said data warehouse and generates distinct value sample queries therefrom if said distinct value queries are associated with a distinct sample; and
a distinct sampling system for use wit said data warehouse and said rewriter subsystem, having:
a scanning subsystem tat scans each row in said data warehouse for a distinct target attribute, employs a hash function to map said distinct target attribute to an attribute priority level, maintains random samples of said each row based on a sample size and a comparison of said attribute priority level and a sample priority level, and produces said distinct sample therefrom, and
a distinct query estimator that receives said distinct value sample queries, causes said distinct value sample queries to be executed on said distinct sample to retrieve a result, and adjusts said result to produce a distinct estimate therefrom.

16. The distinct sampling middleware system as recited in claim 15 wherein said hash function is an exponential distribution hash function having a probability that a particular value of said distinct target attribute is assigned a value j of $2^{-(j+1)}$.

17. The distinct sampling middleware system as recited in claim 15 wherein said data warehouse is session-based event recording database having a session id associated with each event recorded, said distinct target attribute is said session id, and said scanning subsystem maintains all rows associated with said session id that is maintained in said distinct sample.

18. The distinct sampling middleware system as recited in claim 15 wherein said sample priority level is a minimum priority level and said scanning subsystem is further configured to increment said minimum priority level when the number of said random samples reaches said sample size and remove said random samples having said attribute priority level lower than said minimum priority level.

19. The distinct sampling middleware system as recited in claim 15 wherein said random samples are selected based on said sample priority level, said sample size and a distinct value limit, wherein said distinct value limit specifies the maximum number of said random samples to be maintained for each value of said distinct target attribute.

20. The distinct sampling middleware system as recited in claim 15 wherein said distinct sampling system further includes an incremental maintenance subsystem that updates said distinct sample based on incremental updates to said data warehouse, removes a selected random sample from said distinct sample when a deletion or modification request to said data warehouse regards said distinct target attribute, and causes said scanning subsystem to re-scan said data warehouse for said distinct target attribute when the number of said random samples for a particular value of said distinct target attribute falls to a preset limit below a distinct value limit, wherein said distinct value limit specifies the maximum number of said random samples to be maintained for each value of said distinct target attribute.

* * * * *